R. W. HESS.

PUNCHING BAG.

No. 11,648. Reissued Feb. 1, 1898.

Witnesses

Alfred A. Mathey

B. Hayes.

Inventor

Rolla W. Hess.

By his Attorneys

Keller & Starck

THE NORRIS PETERS CO., PHOTO-LITHO., WASHINGTON, D. C.

UNITED STATES PATENT OFFICE.

ROLLA W. HESS, OF ST. LOUIS, MISSOURI.

PUNCHING-BAG.

SPECIFICATION forming part of Reissued Letters Patent No. 11,648, dated February 1, 1898.

Original No. 581,462, dated April 27, 1897. Application for reissue filed September 1, 1897. Serial No. 650,310.

*To all whom it may concern:*

Be it known that I, ROLLA W. HESS, a citizen of the United States, residing at St. Louis, State of Missouri, have invented certain new and useful Improvements in Punching or Striking Bags, of which the following is a full, clear, and exact description, reference being had to the accompanying drawings, forming a part hereof.

My invention relates to certain improvements in that class of striking-bags wherein an inflatable or inflated bag is secured to a flexible resilient standard; and the object of my invention is to provide a standard which will afford a flexible movement in the direction parallel to the plane in which the bag is mounted and a flexible movement at right angles to this plane; and my invention further relates to a manner of mounting the bag on the standard to protect the stem of the bag from being strained or broken off.

My invention consists in features of novelty hereinafter fully described, and pointed out in the claims.

Figure 1:
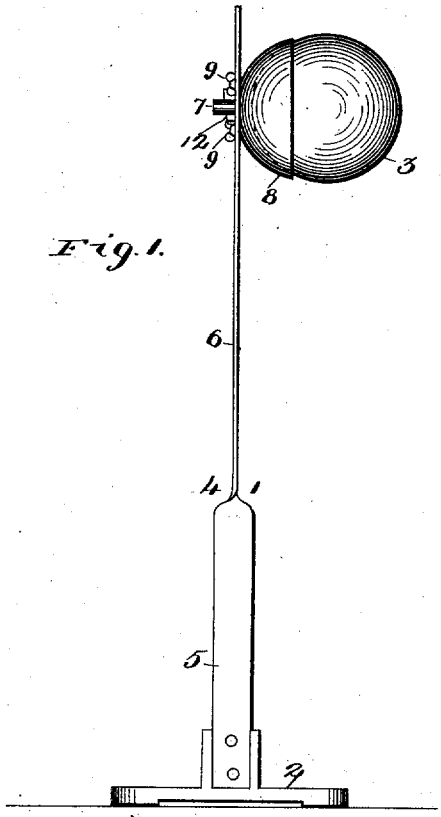
Figure 2:
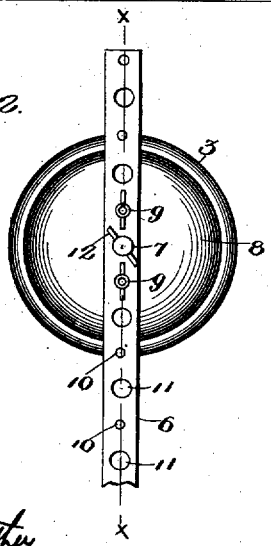
Figure 3:
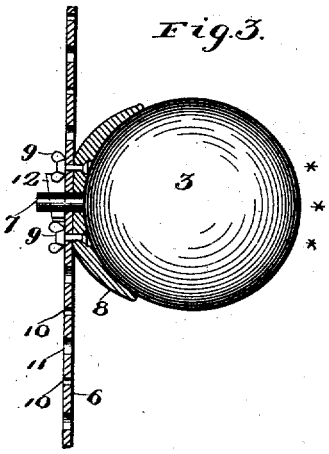

In the drawings, Figure 1 is a side elevation of my invention. Fig. 2 is a detail rear view; and Fig. 3 is a vertical section taken on the line *x x* of Fig. 2, the bag being shown in elevation.

Referring to the drawings, 1 represents a resilient standard secured to a suitable base 2, that is made fast to the floor or other support.

3 represents the bag that is secured adjacent to the upper end of the standard. The standard consists of a flat steel plate provided with a right-angled twist 4, providing a lower portion 5 and an upper portion 6, the flat side of the upper portion being at right angles to the flat side of the lower portion. The upper portion 6 of the standard provides for a flexible movement that is parallel to the plane in which the bag is mounted on the standard, and the lower portion 5 of the standard provides for a flexible movement at right angles to this plane, so that in use the bag may be made to move to and from a person standing directly in front of it or may be made to move laterally in either direction, but it is not susceptible of movement except in these two directions, thus providing a desirable action of the bag, especially to beginners or persons not sufficiently familiar with the use of the bag to control its movements by striking at the proper angles to prevent the bag swinging in a miscellaneous series of directions.

Heretofore, so far as my knowledge goes, the bags in this class of supports have been mounted in a manner that causes them to be struck in a direction substantially at right angles to the stem or point of support of the bag, so that each blow has a tendency to weaken or break the stem 7 of the bag, and so far as I am aware the stem has also been unprotected or unsupported by any surrounding means that would tend to relieve the stem of strain when the bag is struck. To protect the stem from this strain and breakage, I connect the bag to the side of the standard instead of to the top of the standard, as heretofore, so that when the bag is struck the force will be in line or approximately in line with the stem or point of support—as, for instance, if the bag is struck at the points illustrated by the stars in Fig. 3, which would be the case in practice,—the blow is in line or approximately in line with the stem of the bag instead of being at right angles thereto, and thus the blows have little or no tendency to weaken or break the stem, and to further provide for any such tendency that may exist and at the same time to prevent the tendency of the bag to swing laterally with relation to the standard I employ a support or cup-shaped disk 8, that receives the inner part of the bag, as shown in Figs. 1 and 3, and which is itself secured to the vertical walls of and to one side of the free end of the standard by means of bolts or rivets 9, the support resting directly against the side of the standard. The standard is preferably provided with a series of perforations 10 to receive the bolts 9 and a series of perforations 11 to receive the stem 7 of the bag, so that the elevation of the bag may be changed to suit the person using it. When adjusted, the bag is held to the standard and cup by means of a key 12, passing through the perforation in the stem, as seen in Fig. 3.

The support 8, while it subserves the purpose already set forth, at the same time serves as a means to directly communicate the blow imparted to the bag to the resilient standard by which it is supported. The proximity of the walls of the bag to the standard reduces to a minimum any leverage (which may be offered to the person striking or exercising) between the standard and the point of impact against the walls of the bag, thereby minimizing the danger of abnormally twisting the standard about its support and destroying its efficacy. The bag in this case being a pneumatic one—that is, filled with air—transmits any blow imparted thereto, not in a direct line, as would be the case of a solid body or pad, but in all directions, and hence the desirability of locating the same in proximity to the standard. The base of the support 8 in the present instance is located substantially in a direct line of the blow imparted to the bag under ordinary circumstances, so that the direct transmission of such blow to the standard is insured, making the standard responsive to the slightest tap with which the walls of the bag may be struck. While it has been customary to mount inflated bags at the free ends of resilient standards and punching-pads to one side of yielding pivoted standards, I believe I am the first to support an inflatable or inflated bag on a resilient standard, with the support for such bag substantially in direct line of the blow imparted thereto by the striker. By supporting the bag on the standard in proximity thereto, as expressed above, I mean such a juxtaposition of the bag to the standard proper as will insure the location of the support 8 near the standard, whereby any danger of abnormally twisting the standard about its base during the exercising operation virtually disappears.

By a "cup-shaped" support I mean, of course, a shape that will partially embrace the peripheral walls of the bag, and it is obvious that any construction which shall be the equivalent of the one by which the support is secured to the standard would come within the spirit of my invention.

Having described my invention, what I claim is—

1. In a striking-bag, the combination of a bag, and a standard to which the bag is secured, said standard consisting of a flat steel strip having a right-angled twist 4, substantially as and for the purpose set forth.

2. In a striking-bag, the combination of a bag, and a standard to which said bag is secured, said standard being of flattened form in cross-section, and having its upper portion disposed at an approximately right angle to its lower portion, thereby permitting diverse movements of the bag, substantially as and for the purpose set forth.

3. In a striking-bag, a resilient standard, an inflatable or inflated bag, and a support for said bag secured directly to the vertical or side walls of the standard, adjacent to the free end of the standard, substantially as set forth.

In testimony whereof I affix my signature in presence of two witnesses.

ROLLA W. HESS.

Witnesses:
EMIL STAREK,
ALFRED A. MATHEY.